(No Model.)
T. E. ADAMS.
INSULATOR OR BRACKET SUPPORT FOR ELECTRIC WIRES.
No. 390,741. Patented Oct. 9, 1888.
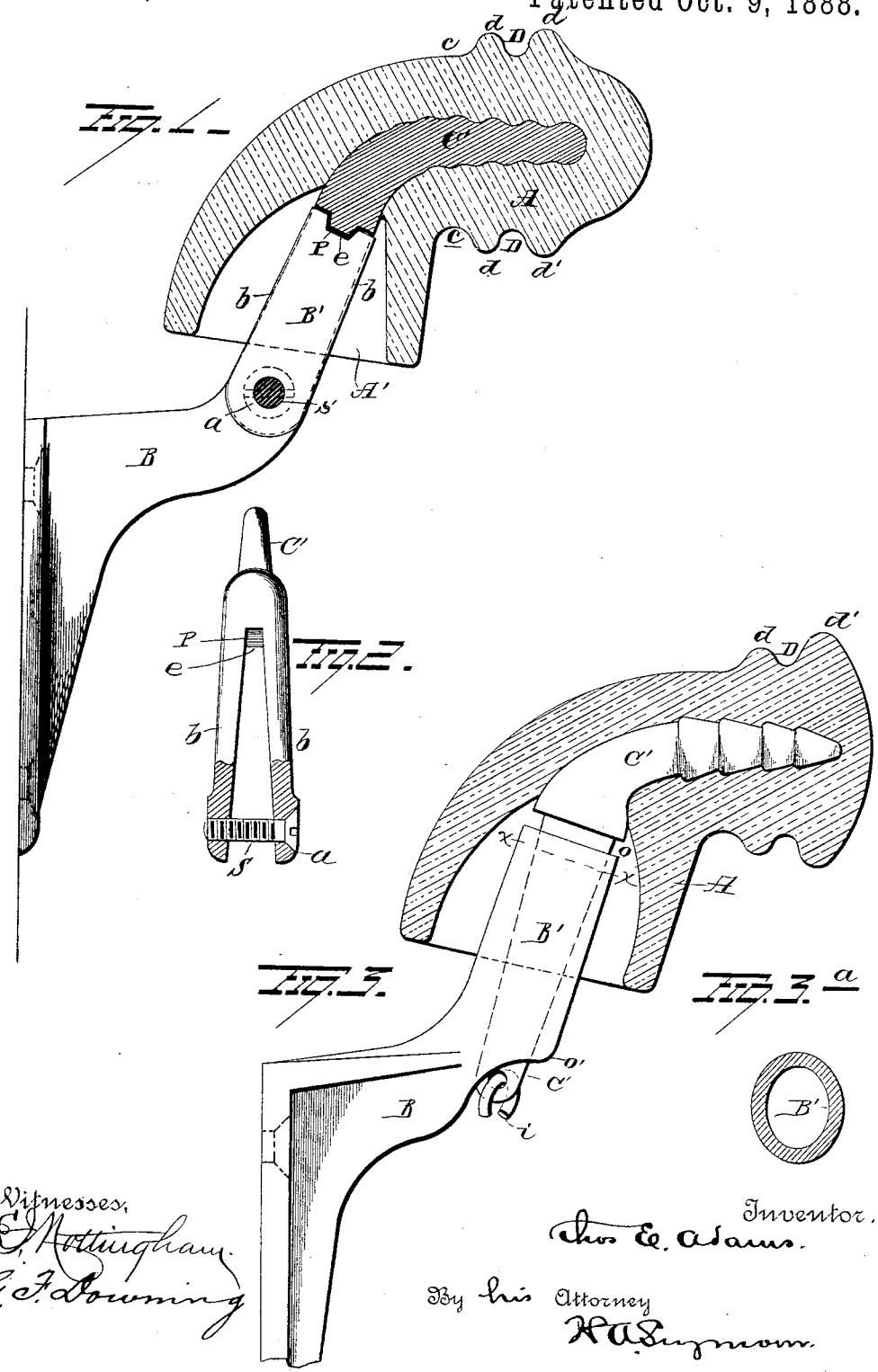

UNITED STATES PATENT OFFICE.

THOMAS E. ADAMS, OF CLEVELAND, OHIO.

INSULATOR OR BRACKET-SUPPORT FOR ELECTRIC WIRES.

SPECIFICATION forming part of Letters Patent No. 390,741, dated October 9, 1888.

Application filed May 23, 1888. Serial No. 274,821. (No model.)

*To all whom it may concern:*

Be it known that I, THOMAS E. ADAMS, of Cleveland, in the county of Cuyahoga and State of Ohio, have invented certain new and useful Improvements in Insulator and Bracket for Support of Electrical Conductor - Wires; and I do hereby declare the following to be a full, clear, and exact description of the invention, such as will enable others skilled in the art to which it appertains to make and use the same.

My invention relates to an improvement in insulators for electrical conductor-wires and their attached supporting bracket-arms.

Various styles of insulators have been devised to afford a non-conducting attachment for electrical line-wires and the loops taken off of such distributing-lines so as to properly support them in position and protect them from electrical connection with the stable supports that have a ground-connection. In extensive systems of electrical distribution—such as electric-lighting and telephone service—numerous loops or branch wires are thrown off from the main lines of conductor-wire, and these lateral loops are carried above or below the main conductors, so that vertical branch wires are a necessary adjunct to such systems.

It is of the first importance in the distribution of electricity on extensive circuits that the insulation of the main and branch conductor-wires should be effected in the best possible manner, and as large numbers of these insulators are required it is desirable to have such devices made cheaply without sacrifice of durability and efficiency. One fruitful source of current dissipation and consequent loss of electrical energy consists in the electrical conductivity of water; and, as distributing-lines with their branches are exposed to the elements, it follows that if an insulator is not devised to prevent rain from having access to its point of juncture with its bracket that attaches it to a pole or other support in contact with the earth, a ground-connection is invariably formed during the prevalence of a rain-storm. It has been found in practice that, by the provision of a protecting-canopy which is made integral with the insulator proper and depends therefrom to surround the point of juncture of the bracket-support with said insulator, if such a protecting-canopy is maintained in or near a vertical plane the shank of the bracket will be kept dry, or at least not in contact with a flow of water which would carry off the electricity at these points of connection with the earth, or, rather, with supports that by the rain are converted into positive electrical conductors from the line-wire to the ground.

Heretofore insulators having canopies formed integral with their bodies have been provided, which from the form given the insulator are not convenient to allow the connection of a vertical conductor - wire with their grooved surface, as this groove, in which said conductor is located, should lie in the same vertical plane therewith to facilitate the attachment of a tie-band in the usual manner.

If the ordinary canopied insulator is used to afford support to a vertical or upwardly-inclined electric conductor-wire, it is evident that it will be necessary to affix the insulator in a horizontal position, so as to allow its grooved upper portion or "head" to be properly engaged with such an upwardly-directed wire; consequently the canopy will fail to protect the point of contact of the supporting-bracket with the insulator-body, and imperfect insulation is the result.

The primary object of my present invention is to produce an insulator which will be of simple practical form of construction, and which will afford all the advantages of a dry canopy when the insulator is used in connection with a vertical or upwardly-inclined conductor-wire, so as to protect such line-wires from ground-connections at the points of insulated support.

A further object is to provide an insulator which is universal in its application, and which will afford a dry canopy for perfecting the insulation on main lines where the conductor-wires are in a nearly horizontal plane, or be equally serviceable when applied to vertical or diagonally-inclined branches or loops from the main line.

A further object is to furnish an insulator proper with a bracket-arm preferably made of metal, which will be in two or more parts capable of ready and secured connection with each other, one part being rigidly attached to the insulator-body, while the foot-piece may be disconnected therefrom to allow it to be affixed by nails or other means in stable position for support of the line-wire, and thus obviate the danger of breakage of the insulator-body when such attachment is in progress of execution.

With these objects in view my invention consists in certain features of construction and combinations of parts, that will be hereinafter described, and pointed out in the claims.

Referring to the drawings making a part of this specification, Figure 1 is a side elevation of the insulator and its supporting bracket-arm, the body of the insulator being in section. Fig. 2 is an edge view of the upper portion of the bracket-arm removed from the insulator-body in which it is to be embedded. Fig. 3 is a side elevation of a modified form of the foot-piece of the bracket-arm, and Fig. 3ª a cross-section on line $x\ x$.

A represents the body of the insulator, which is preferably made of glass; but other electric non-conducting materials may also be employed, such as hard rubber, wood, paper, or compounds of the same. The head of the insulator is solid, as shown in Fig. 1, and is provided with a groove, D, formed between the ribs $d\ d'$, of a size to receive a line-wire and retain it from lateral displacement when said wire-conductor is tied, in the usual manner, by a short bent wire strand. (Not shown.) From the neck $c$, near the rib $d$, the insulator is gradually increased in its diameter to form a flaring lower end, and the body of the insulator is bent so as to cause this open bell-shaped extremity A' to project downwardly, while the groove D is maintained in a vertical plane, and therefore adapted to receive a conductor-wire led in a similar direction.

The curvature of the body of the insulator in its preferred form, as shown in Fig. 1, may be such as to conform to an angle of ninety degrees. In some cases it may not be necessary to bend the body to a right angle; but for general uses the bend made in the body should approach such an angle as will enable the circumferential groove D to lie in a vertical plane, while the annular canopy A', formed in the lower portion, is adapted to protect the shank of the bracket-arm C where it is in contact with the upper or head portion of the insulator.

In order to adapt the insulator-bracket to fit different objects which afford support thereto, the foot-piece B may be given any necessary conformation. The shapes shown in Figs. 1 and 3 are available to secure the bracket upon a vertical wall or a horizontal beam, sign, or other stable object. It is evident that the foot-piece B may be bifurcated or bent at any proper angle to render it convenient in the matter of attachment to its support. The other portion of this separable bracket-arm is shown in Figs. 1 and 2. It consists of a metal piece preferably cast into form out of malleable iron or soft steel, and has its body bent to conform to the curvature of the insulator A, the upper portion, C', having serrations or grooves made on its surface to adapt it to be secured in the body of the insulator A, which latter is preferably molded over the bracket-limb C' when manufactured, so that the contraction of the molten material will forcibly embrace this limb and affix it in place.

At a point, $e$, the bent upper section, C', of the bracket-arm is bifurcated. The two limbs $b\ b$ thus produced are caused to diverge from each other at a proper angle to allow the tapered upper portion, B', of the bracket-foot B to be embraced closely by these limbs $b\ b$ when the parts are adjusted together, and a tongue, P, formed at the point of separation of the limbs $b\ b$ is mated to a notch, P', (see Fig. 1,) so that these pieces will be interlocked when the crotched limb C' is fitted upon the limb B'. A set-screw, S, is introduced in a tapped perforation provided for its reception at $a$ in the lower ends of the limbs $b\ b$, which will effectually secure the two sections of the bracket-arm together, and as the screw S is made of brass or other non-oxidizable metal, the detachment of the upper portion with the insulator-body may be speedily effected when desired.

It is an obvious fact that if the groove D of the insulator-head is located in a vertical plane it will be as readily engaged by a vertical as a horizontal wire, and intermediate deviations from these planes may be also compensated for by the manner of attachment mentioned, or by a change of position of the bracket-foot B.

In Figs. 3 and 3ª a preferred form of bracket-foot is shown, the upwardly-inclined limb B' of which is perforated longitudinally, this hole being tapered from the upper end, $o$, to the lower edge, $o'$, and made oval in cross-section, as shown at $x\ x$ in Figs. 3 and 3ª, a cross-hole being made through the lower end of the mating tapered shank of the piece C', to receive a wire ring or securing-key. This plan of construction will permit a quick adjustment of parts together and facilitate the manufacture of the bracket-support of the insulator.

Having fully described my invention, what I claim as new, and desire to secure by Letters Patent, is—

1. An insulator for electrical conductor-wires, consisting, essentially, of a curved body having a grooved head at one end and a shield or canopy at its lower end, the said groove and canopy being in parallel or approximately parallel vertical planes, substantially as set forth.

2. An insulator having a grooved head, a flaring curved body, and a water shield or canopy at the lower end, which is adapted to protect an engaged supporting-bracket when the groove is in or near a vertical plane, substantially as set forth.

3. In an insulator for electrical conductor-wires, the combination, with an insulator-body, which is bent at nearly a right angle, having a grooved head and a hollow base that provides protection from water to an attached bracket-limb when the groove is located in or near a vertical plane, of a separable bracket-arm, the upper limb of which is secured in the insulator-head, substantially as set forth.

4. In an insulator for electrical conductors, the combination, with an insulating-body, which is grooved circumferentially near one end, bent near the groove to cause the other part of the body to project downwardly, said lower portion being hollowed and widened to produce a flaring canopy, of a separable bracket-arm, one portion being affixed rigidly within the insulator-body, and the other part being adapted to attach the insulator to a stable support in any desired position, substantially as set forth.

5. In an insulator for electrical conductor-wires, the combination, with an insulator-body having a grooved head, a hollow base, and a body bent to locate the groove and base in nearly parallel planes, of a bracket-arm composed of a bent upper limb rigidly secured in the insulator-body and bifurcated to produce two depending limbs which are adapted to interlock with and be secured to the other piece of the bracket-arm, substantially as set forth.

In testimony whereof I have signed this specification in the presence of two subscribing witnesses.

THOMAS E. ADAMS.

Witnesses:
A. D. DORMAN,
JOHN E. ERICKSON.